United States Patent
Kim et al.

(10) Patent No.: US 9,210,679 B2
(45) Date of Patent: Dec. 8, 2015

(54) METHOD FOR PERFORMING OFFLINE INDICATION OF MACHINE TYPE COMMUNICATION DEVICE IN MOBILE COMMUNICATION SYSTEM

(75) Inventors: Taehyeon Kim, Gyeonggi-Do (KR); Hyunsook Kim, Gyeonggi-Do (KR); Laeyoung Kim, Gyeonggi-Do (KR); Saso Stojanovski, Paris (FR); Arnaud Vedrine, Paris (FR)

(73) Assignee: LG ELECTRONICS INC., Seoul (KR)

( * ) Notice: Subject to any disclaimer, the term of this patent is extended or adjusted under 35 U.S.C. 154(b) by 687 days.

(21) Appl. No.: 13/501,742

(22) PCT Filed: Jan. 7, 2011

(86) PCT No.: PCT/KR2011/000123
§ 371 (c)(1),
(2), (4) Date: Sep. 11, 2012

(87) PCT Pub. No.: WO2011/084010
PCT Pub. Date: Jul. 14, 2011

(65) Prior Publication Data
US 2013/0017829 A1      Jan. 17, 2013

Related U.S. Application Data

(60) Provisional application No. 61/293,210, filed on Jan. 8, 2010, provisional application No. 61/294,086, filed on Jan. 11, 2010, provisional application No. 61/303,641, filed on Feb. 11, 2010, provisional application No. 61/333,723, filed on May 11, 2010.

(30) Foreign Application Priority Data

Oct. 29, 2010   (KR) .................... 10-2010-0107280

(51) Int. Cl.
*H04W 60/06*   (2009.01)
*H04W 4/00*    (2009.01)

(52) U.S. Cl.
CPC .................... *H04W 60/06* (2013.01)

(58) Field of Classification Search
CPC ....................... H04W 60/06; H04W 4/005
USPC ......................... 455/435.1; 370/329
See application file for complete search history.

(56) References Cited

U.S. PATENT DOCUMENTS

2007/0153997 A1*   7/2007   Shang ................ 379/114.29
2010/0238893 A1*   9/2010   Vikberg et al. ............ 370/329

FOREIGN PATENT DOCUMENTS

EP           1727329 A1 *   11/2006
KR   10-2009-0130373        12/2009

(Continued)

OTHER PUBLICATIONS

Sierra Wireless, "Contribution to TS 22.368—Chapter 7.2.x Offline Indication", S1-094198, 3GPP TSG-SA1 #48, Nov. 2009.

(Continued)

*Primary Examiner* — Marisol Figueroa
(74) *Attorney, Agent, or Firm* — Lee, Hong, Degerman, Kang & Waimey

(57) ABSTRACT

The present invention relates to a mobile communication system and, more particularly, to a method for performing offline indication of a machine type communication (MTC) device in an MTC service. A network entity checks (or searches) whether or not an MTC device is out of monitoring or management because it is in an offline state. A network entity repeatedly transmits a signal for checking whether or not the UE is currently in an offline state to the UE during operation time of a timer, namely, during a detection time, or checks a signal (e.g., a message of an attach procedure, a message of a location registration procedure, and the like) transmitted by the UE during the detection time to check whether or not the UE is in an offline state. When the UE is checked to be in an offline state, the network entity informs an MTC server or an MTC user accordingly, to thus automatically manage a loss, malfunction, or the like, of the MTC device.

10 Claims, 6 Drawing Sheets

(56) References Cited

FOREIGN PATENT DOCUMENTS

| KR | 10-2009-0131373 | 12/2009 |
| KR | 10-2009-0132149 | 12/2009 |
| WO | 2009/149759 | 12/2009 |

OTHER PUBLICATIONS

Vodafone et al., "Contribution to TS 22.368—Chapter 6.1 General-Concept", S1-094078, 3GPP TSG-SA1 #48, Nov. 2009.

* cited by examiner

METHOD FOR PERFORMING OFFLINE INDICATION OF MACHINE TYPE COMMUNICATION DEVICE IN MOBILE COMMUNICATION SYSTEM

CROSS-REFERENCE TO RELATED APPLICATIONS

This application is the National Stage filing under 35 U.S.C. 371 of International Application No. PCT/KR2011/000123, filed on Jan. 7, 2011, which claims the benefit of earlier filing date and right of priority to Korean Application No. 10-2010-0107280, filed on Oct. 29, 2010, and also claims the benefit of U.S. Provisional Application Nos. 61/333,723, filed on May 11, 2010, 61/303,641, filed on Feb. 11, 2010, 61/294,086, filed on Jan. 11, 2010, and 61/293,210, filed on Jan. 8, 2010, the contents of which are all incorporated by reference herein in their entirety.

TECHNICAL FIELD

The present invention relates to a mobile communication system and, more particularly, to a method for performing offline indication of a machine type communication (MTC) device in an MTC service.

BACKGROUND ART

To deal with various forums and novel techniques in relation to 4th mobile communication system, 3GPP stipulating technical standards of 3rd mobile communication system started to study an LTE/SAE (Long Term Evolution/System Architecture Evolution) technique as part of efforts to optimize and improve the performance of 3GPP techniques in late 2004. The SAE, which has proceeded based on 3GPP SA WG2, relates to a network technology aiming at determining a network structure by interworking with an LTE operation of 3GPP TSG RAN and supporting mobility between heterogeneous networks. The SAE, one of the key standardization issues of 3GPP, is to advancing a 3GPP system to a system supporting various radio access techniques based on an IP, and working for an optimized packet-based system which may be able to minimize a transmission delay with improved data transmission capabilities.

Technical terms used in the present disclosure will now be described.

An MTC function is a function of supporting communication between MTC devices or between an MTC device and an MTC server, which performs communication without an intervention of a human being, unlike the existing person-to-person connection. For example, an MTC application may include communication between an automatic vending machine and a server, a POS (Point of Service) device and a server, an electricity or water meter and a server. Here, the corresponding device is called an MTC device. The MTC is also called machine-to-machine communication.

TA (Tracking Area) refers to an area in which an E-UTRAN provides a service, including one or a plurality of E-UTRAN cells. An RA (Routing area) refers to an area in which a GERAN/UTRAN provides a service, including one or a plurality of GERAN/UTRAN cells.

—TAI (Tracking Area Identity) list refers to a list of TA identities identifying tracking areas a user equipment (UE) may enter without having to perform a TA updating procedure. The TAIs in the TAI list assigned by an MME (Mobility Management Entity) to a UE pertain to the same MME area. A detailed description of the TAI list will quote the matters stated in the standard document 3GPP TS 24.301 v9.1.0.

MME area: An MME area is the part of the network served by an MME. The MME area includes one or a plurality of TAs. All the cells served by an eNodeB are included in an MME area. A detailed description of the MME area will quote the matters stated in the standard document 3GPP TS 23.002 v9.2.0.

—UMTS: It stands for Universal Mobile Telecommunication System, which means a 3G network.

—EPS: It stands for Evolved Packet System, a core network supporting an LTE access network. Also, the EPS has evolved from UMTS.

—NodeB: It is a base station of a UMTS network, which is installed in an outdoor area and has coverage of a macro cell size.

—eNodeB: It is a base station of an EPS network, which is installed in an outdoor area and has coverage of a macro cell size.

—UE: It stands for User Equipment, which means a UE device.

—IMSI: It stands for International Mobile Subscriber Identity, which is a user's unique identifier assigned solely internationally in a mobile communication network.

—SIM card: It stands for Subscriber Identity Module, which is used to have the same meaning as a SIM card.

—MTC: It stands for Machine Type Communication, which refers to communication performed between machines without a human being's intervention.

—MTC device: It refers to a UE (or UE) performing a particular purpose having a communication function through a core network. The UE may be, for example, a vending machine, a meter or a gauge, or the like.

—MTC server: It refers to a server which manages an MTC device and transmits and receives data in a network.

—MTC application: It is an actual application using an MTC device and an MTC server, including, for example, inspection of a meter, tracking a supply movement.

—MTC feature: functions or features of a network supporting an MTC application, namely, some features, are required according to the purpose of respective applications. The MTC features may include, for example, MTC monitoring (e.g., required for a remote inspection of a meter in preparation for a loss of equipment), low mobility (e.g., in case of a vending machine, it scarcely moves.

—RAN: It stands for Radio Access Network, which is a general term for 3GPP radio access such as RNC, NodeB, or eNodeB.

—HLR (Home Location Register)/HSS (Home Subscriber Server): It is a database (DB) representing subscriber information within a 3GPP network.

—RANAP: It stands for Radio Access Network Application Part, which refers to an interface between RAN and network nodes (MME/SGSN/MSC) which are in charge of handling a core network.

—ICS (IMS Centralized Services): It stably provides a consistent service of IMS regardless of an access network to which a UE is attached (namely, although the UE is attached to a CS domain as well as to an IP-CAN). A detailed description of the ICS will quote the matters stated in the standard document 3GPP TS 23.292 v9.4.0.

—IMS (IP Multimedia Subsystem): It refers to a system providing a multimedia service on the basis of an IP network.

—Attach: It refers to a connection of a UE to a network node, including an attach generated in the occurrence of handover in a broad sense.

—Point of attachment: It refers to an access point of a UE.

The present invention will now be explained with reference to the foregoing technical terms.

FIG. 1 is a conceptual view of a 3GPP service model for supporting MTC.

GSM/UMTS/EPS of 3GPP standard defines communication through a PS network, but in the present invention, a method applicable even to a CS network will be described. A definition of a network architecture in a current technical standard has been proposed to use an existing bearer of 3GPP. Meanwhile, a method of using an SMS (Short Message Service) for exchanging data between an MTC device and an MTC server has been proposed as one of alternative solutions. The use of SMS has been proposed in consideration of the fact that a small amount of digital data such as metering information, product information, or the like, is handled in UEs of the MTC application, by which the existing SMS method and an SMS method on the basis of an IMS can be supported In FIG. 1, MTCsms is a data exchange interface through the existing SMS method, and MTCi is a data exchange interface through the IMS-based SMS method. In addition, there are methods for regulating a paging range for an MTC application with a little mobility.

The 3GPP system such as the conventional GSM/UMTS/EPS is defined for communication between end-users, namely, between human beings. However, the conventional mobile communication system is not effective for communication between an MTC device and an MTC server, and also not an optimized communication solution. Thus, recently, 3GPP has set to work to define functions and mechanisms for exchanging data between the MTC device and the MTC server, but detailed, substantial methods still remain insufficient. Also, in terms of numerous MTS applications, the MTC device is independently installed and operated without a human being's operation. In this state, the MTC device may be lost, broken down, or malfunction, so in order to automatically manage the MTC device, there is a need to check (or monitor) whether or not the MTC device is in an online or offline. Also, in order to check whether or not the MTC device is in online or offline, a technical necessity to be supported by the function of an existing network system, e.g., a 3GPP core network, rather than establishing a network and a system to a separate management is required. Namely, the advantages of maximizing utilization and efficiency of communication of the existing network and channel resources can be obtained by using the existing network infrastructure.

DISCLOSURE OF INVENTION

Solution to Problem

Therefore, in order to address the above matters, the various features described herein have been conceived.

An aspect of the present invention provides a method for transmitting an offline state of an MTC (Machine Type Communication) device to a network by effectively applying an offline indicator, one of MTC features, in order to monitor and manage the generation of a loss, error, and malfunction of the MTC device.

According to an aspect of the present invention, there is provided a method for performing an offline indication of an MTC device in a mobile communication system, including: (C) receiving, by a core network node, a notification message informing that a UE can perform an offline indication function from a first radio access network (RAN); (D) receiving, by the core network node, a notification message regarding an offline indication of the UE from a second RAN; and (E) comparing, by the core network node, the notification message received from the first RAN in the step (C) and the notification message received from the second RAN in the step (D) to determine whether or not the UE is in an offline state.

The method may further include: (A) receiving, by the core network node, MTC (Machine Type Communication) information including a detection time from an HSS (Home Subscription Server); and (B) transmitting, by the core network node, the MTC information including the detection time to the UE through the second RAN.

The method may further include: when it is determined that the UE is in an offline state in step (E), reporting, by the core network node, to a reporting server that the UE is in an offline state.

The notification message in step (C) may include at least one or more of an ID of the UE, an MTC device indicator indicating that the UE is an MTC device, and an offline indication indicator indicating that the UE may perform the function of an MTC offline indication.

The notification message in step (D) may include an ID of the UE, an MTC device indicator indicating that the UE is an MTC device, and an offline indication indicator indicating that the UE may perform the function of an MTC offline indication.

The step (E) may include: comparing information regarding an offline indication included in the notification message received from the second RAN and information regarding an offline indication included in the notification message received from the first RAN; determining whether or not the notification messages have been transmitted from the same UE according to the comparison results; and when it is determined that the notification messages have been transmitted from the same UE, determining that the UE is in an offline state on the basis of the notification message received from the first RAN.

The notification message in step (D) may be transmitted from the second RAN after a timer using the detection time included in the MTC information expires.

The method may further include: after the second RAN transmits the notification message, resetting the timer.

The method may further include: transmitting a response message with respect to the notification message in step (C) to the UE through the first RAN; and transmitting a response message with respect to the notification message in step (D) through the second RAN.

The response message transmitted to the first RAN may include at least one or more of an ID of the UE, an MTC device indicator indicating that the UE is an MTC device, and an offline indication indicator indicating that the UE may perform the function of an MTC offline indication, so that the first RAN may perform an offline indication with respect to the UE.

The first RAN may be a cell to which the UE has moved and is currently camping on, and the second RAN may be a cell in which the UE was connected before it was moved therefrom.

According to an aspect of the present invention, there is provided a method for performing an offline indication by a UE in an idle mode state with a core network node in a mobile communication system, including: (a) receiving, by the core network node, a first notification message informing that the UE is in an online state and is able to perform an indication function from a first RAN (Radio Access Network) which the UE has been moved to and is currently camping on; (b)

receiving, by the core network node, a second notification message informing that the UE is in an offline state from a second RAN to which the UE was connected before it was moved therefrom; (c) checking, by the core network node, whether or not the first and second notification messages have been received; and (d) when only the second notification message has been received, determining, by the core network node, that the UE is in an offline state.

The method may further include: when it is determined that the UE is in an offline state in step (d), transmitting, by the core network node, an offline indication of the UE to a reporting server.

According to an aspect of the present invention, there is provided a method for performing an offline indication of an MTC device in a mobile communication system, including: (AA) operating, by a network entity, a timer at every detection time and checking whether or not the operation of the timer has expired; (BB) when it is checked that the timer has expired, transmitting, by the network entity, a message including an offline indication indicator indicating an offline indication to the UE; (CC) checking, by the network entity, whether or not a response message with respect to the message indicating the offline indication has been received; and (DD) when a response message has not been received, notifying, by the network entity, the reporting server that the UE is in an offline state.

The network entity may be a core network node or a radio access network (RAN).

The method may further include: receiving, by the network entity, MTC (Machine Type Communication) information of the UE from a home subscriber server, wherein the MTC information of the UE may include the detection time.

The MTC information of the UE may be set when the UE registers to an MTC server, and transmitted from the MTC server to the home subscriber server.

The message indicating the offline indication may be a paging message using a NAS or an ACK message, or a paging message of an RRC level or an ACK message.

The (DD) step may include: when the network entity is an RAN, notifying, by the RAN, the core network node, about the offline state of the UE.

According to an aspect of the present invention, there is provided a method for performing an offline indication of an MTC (Machine Type Communication) device in a mobile communication system, including: when a timer expires at every detection time, receiving, by a network entity, a message indicating about an online state of the UE from the UE in an idle mode state, the message including MTC device indicator indicating that the UE is an MTC device; transmitting, by the network entity, a response message with respect to the message informing that the UE is in the online state, to the UE; and when the network entity operates the timer, the timer expires at every detection time, and the network entity fails to receive a message informing about an online state from the UE, notifying, by the network entity, a reporting server that the UE is in an offline state.

The network entity may be a core network node or a radio access network (RAN).

According to exemplary embodiments of the present invention, the 3GPP GSM/UMTS/EPS system supports the MTC (Machine Type Communication) function to make communication between a machine and a server available.

In particular, the core network checks (notifies about) an offline state of the MTC to detect whether or not the MTC device is broken down, malfunctions, or whether or the MTC device has been lost, and informs the user of the MTC device accordingly, thus accomplishing an automated management.

The foregoing and other objects, features, aspects and advantages of the present invention will become more apparent from the following detailed description of the present invention when taken in conjunction with the accompanying drawings.

MODE FOR THE INVENTION

Figure 1:
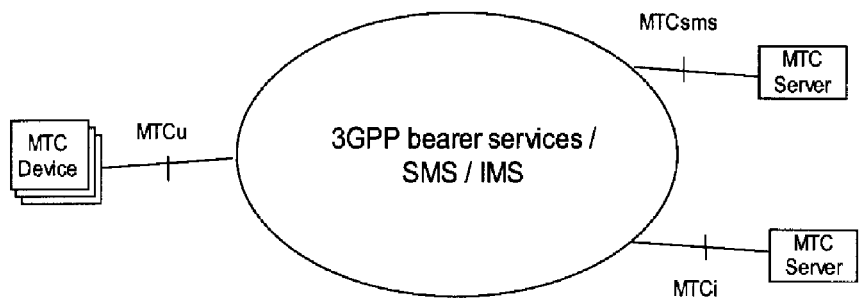
FIG. 1 is a conceptual view illustrating a 3GPP service model for supporting MTC (Machine Type Communication)

The present invention is applied to a mobile communication system using MTC (Machine Type Communication); however, the present invention is not limited thereto and may also be applied to next-generation mobile communication and any other wired/wireless communication to which the technical concept or idea of the present invention is applicable.

The present invention may be embodied in many different forms and may have various embodiments, of which particular ones will be illustrated in drawings and will be described in detail. However, it should be understood that the following exemplifying description of the invention is not meant to restrict the invention to specific forms of the present invention but rather the present invention is meant to cover all modifications, similarities and alternatives which are included in the spirit and scope of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. The term "and/or" encompasses both combinations of the plurality of related items disclosed and any item from among the plurality of related items disclosed.

It will be understood that when an element is referred to as being "connected with" another element, it can be directly connected with the other element or intervening elements may also be present. In contrast, when an element is referred to as being "directly connected with" another element, there are no intervening elements present.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

A UE according to an exemplary embodiment of the present invention may refer to any device that may be able to perform technical features or characteristics of the present invention. Namely, the UE according to an exemplary embodiment of the present invention has a comprehensive meaning enough to include a mobile communication UE capable of performing an MTC service function (e.g., a pacemaker, a vending machine, a power meter, air pollution measurement device, and the like), a user equipment (UE), human-centered devices (e.g., a mobile phone, a portable phone, a DMB phone, a game phone, a camera phone, a smartphone, and the like), a notebook computer, a desktop computer, a laptop computer, a palmtop computer, a personal digital assistant (PDA), white appliances (or consumer white goods), and the like.

Embodiments of the present invention will be described below in detail with reference to the accompanying drawings, where those components are rendered the same reference number that are the same or are in correspondence, regardless of the figure number, and redundant explanations are omitted.

The present invention provides a method for using an MTC offline indication among MTC functions. In particular, an MTC device checks (or searches) whether or not an MTC device is out of monitoring or management because it is in an offline state. A network entity repeatedly transmits a signal for checking whether or not the UE is currently in an offline state to the UE during a timer operation time, namely, during a detection time, or checks a signal (e.g., a message of an attach procedure, a message of a location registration procedure, and the like) transmitted by the UE during the detection time to check whether or not the UE is in an offline state. When the UE is checked to be in an offline state, the network entity informs an MTC server or an MTC user accordingly, to thus automatically manage a loss, malfunction, or the like, of the MTC device.

In order to implement an embodiment of the present invention the following matters are presumed: 1) the MTC user sets a detection time for a detection; 2) information regarding a set detection time is stored in a database of a subscriber; 3) a radio access network (RAN) or a core network node (e.g., an MME, an SGSN, or MSC) must check an offline state of the MTC device at least one or more times within every detection time on the basis of subscriber information; 4) when an offline state of the MTC device is detected, the core network informs the MTC server or the user about the offline state. The user of radio resources with respect to the corresponding MTC device can be limited.

Figure 2:
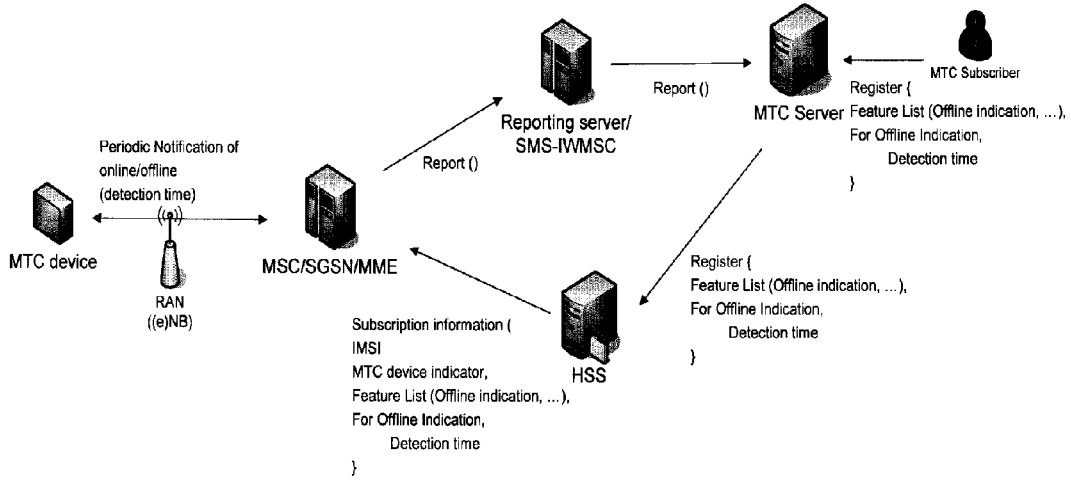
FIG. 2 is a conceptual view illustrating a core network architecture for MTC monitoring and transmission parameter.

FIG. 2 is a conceptual view illustrating a core network architecture for MTC monitoring and transmission parameter.

As shown in FIG. 2, a core network node handling MTC monitoring may be one of an MSC, an SGSN, and an MME. Namely, when the MSC uses circuit switching (CS) access in a 2G or 3G network, when the SGSN uses a packet switching (PS) access in the 2G or 3G network, and when the MME uses a PS access in an EPS network, the MSC, the SGSN, and the MME operates. To this end, the subscription information is stored in a user DB such as an HLR or an HSS, and the subscription information is delivered to the core network node in the case of attach. In the occurrence of attach or in the occurrence of TAU/RAU/LAU/handover, monitoring is performed by using information delivered from the MTC device or the RAN. When an event is detected in monitoring the MTC device, the core network node informs a server (i.e., a reporting server and/or an MTC server0 or the user (namely, an MTC subscriber) about the detected event.

In the present invention, in order to perform an offline indication, among the MTC features, on the basis of the architecture as illustrated in FIG. 2, the following processes are performed: 1) registering subscription information to a core network; 2) checking an offline state of the UE (or the MTC device) at every detection time on the basis of the subscription information registered to the core network; and 3) when an offline state of the UE is detected, informing the MTC server or the MTC user accordingly. The respective processes of performing the MTC offline indication will now be described in detail.

(1) The subscription information is registered to the core network as follows.

In order for a mobile communication network to support an M2M service with respect to the MTC device, content required for subscriber information must be set. Namely, the MTC user records subscription information in the MTC server. For example, the subscription information required for the MTC device is as shown in Table 1 below. Each of the subscription information in Table 1 may have a parameter (or element) format

TABLE 1

IMSI
MTC device indicator
Allowed Feature list (Monitoring, . . . )
For Offline indication
                                                      Detection time The information (or parameter) of Table 1 will be described as follows. 'MTC device indicator' is an indicator (or parameter) indicating that the UE is a MTC device. Namely, the MTC device as a target of M2M service must be employed in a form different from the existing human-to-human communication service. The subscription information must discriminately show a person or a device (MTC device). To this end, in order to indicate that the UE is an MTC device in the subscription information, an MTC device indicator is used. Meanwhile, alternatively, a particular value or a particular range may be assigned in configuring an ID (IMSI, etc.) to indicate that a target of the M2M service is the MTC device.

'Allowed Feature list' refers to a list of features to be used for the UE. Here, as defined above, the features refer to the functions or features of the network for supporting an MTC application, and various features may be used together according to a purpose to use the MTC device. Also, each feature may require individual attributes.

In Table 1, 'offline indication', among the features, is set, and in case of the offline indication, a detection time is set as one attribute. The detection time refers to a repetition period (or time) at which the offline state of the UE must be detected or checked.

When the MTC user records the information as shown in Table 1 in the MTC server, the MTC server delivers the same to the HLR/HSS, subscriber information database of the core network. Also, such information is delivered from the MTC server to the core network node in the occurrence of attach or upon receiving a corresponding request from the core network node.

Table 2 shows an example of subscription information registered to the MTC server according to an exemplary embodiment of the present invention.
— In Table 2, an 'IMSI' value of the UE (UE) is '0314504130'.
— 'MTC device indicator' indicates that the UE is an MTC device.
— A feature to be employed for the MTC device in Table 2 is features of 'monitoring' and 'offline indication'.
— An event to be detected by performing 'monitoring', the first feature, includes a data limit, abnormal data, and the like.
— An allowed location list is Cell1, Cell2, and Cell3 areas
— Allowed IMEI (International Mobile Equipment Identity): UE must be used only in an LG-AA00508 device.
— For the offline indication, the second feature, a detection time is set to two minutes (namely, the offline state of the UE must be checked at every two minutes).

TABLE 2

| Classification | Attribute | Application example |
|---|---|---|
| IMSI | | 0314504130 |
| MTC device indicator | | "MTC device" |
| Allowed Feature list For MTC monitoring | | (Monitoring, Offline indication) |
| | Events list for Monitoring | data limit, abnormal data, etc. |
| | Allowed Location list, | Cell1, Cell2, Cell3 |
| | Allowed IMEI | LG-AA00509 |
| For Offline indication | | |
| | Detection time | 2 min |

An offline indication according to an exemplary embodiment of the present invention will now be described.

(2) A method for performing offline indication is described as follows.

The purpose of offline indication is to detect an offline state of the UE within a detection time. To this end, a method of receiving a signal from the UE by the RAN is basically used.

First, when a UE is disconnected in a connected mode or when a detach command is transmitted, certain signalling is delivered, so whether or not the UE is in an offline state can be detected according to the existing method. In general, the UE operates to be switched between a connected mode and an idle mode in consideration of battery consumption, or the like. The following exemplary embodiment is applied to a case in which the UE is in the idle mode, namely, there is no signalling exchange with the RAN or the core network. In other words, when signalling occurs at the level of NAS (Non Access Stratum) or RRC (Radio Resource Control), the timer of the detection time is reset, and when the timer expires, an online state in the UE or the RAN (or the core network) is informed or an offline state of the UE is checked. In this case, the NAS or RRC signalling (or NAS or RRC message) may not be any particular message but any message may be used as the NAS or the RRC message.

Meanwhile, in the present exemplary embodiment, the RRC message is transmitted in between a UE and a radio access (e.g., a UTRAN), an S1-AP message is a message transmitted between the radio access and the core network node (i.e., MME/SGSN/MSC), and the NAS message is a message transmitted between the UE and the core network node. In this case, the NAS message is included in the RRC message or the S1-AP message by using a parameter and transmitted.

The method of performing an offline indicator according to an exemplary embodiment of the present invention will now be described. The method of performing an offline indicator according to an exemplary embodiment of the present invention may be classified into a so-called NAS message-based method, RRC and RANAP (S1-AP/Iu/Gb) message-based method (RAN level method), and a hybrid offline indication.

(2-1) Nas Message-Based Method

In this method, in order for the core network to detect an online or offline state of the UE, a NAS message is used. The NAS message-based method may be classified into the following two methods.

(a) A network polling method: The core network transmits a NAS message inquiring about an online or offline state of the UE to the UE at every minimum detection time, and the UE responds to the NAS message.

(b) A UE indication method: The core network node transmits a detection time through a NAS message to the UE. The UE periodically informs the core network that the UE is in an online state through a NAS message at ever minimum detection time. Meanwhile, as the NAS message indicating that the UE is in an online state, an existing NAS message may be utilized or a new message may be defined. In this case, the existing NAS message may be a TAU (Tracking Area Update)/RAU (Routing Area Update) message, or the like, and the message transmitted from the core network may be a paging message requesting a service request message. Meanwhile, at the core network's stance, if at least one or more messages are received from the UE within the detection time, the core network determines that the UE is currently in the online state, no matter whether what the message is. Or, otherwise, the core network determines that the UE is currently in the offline state.

(2-2) RRC and RANAP (S1-AP/Iu/Gb) Message-Based Method (RAN Level Method)

This method may be divided into a network polling method and a UE indication method.

(a) Network polling method: The core network node transmits a detection time to the RAN through RANAP (S1-AP/Iu/Gb) message. The RAN transmits a particular message or paging to the UE at every minimum detection time to check whether or not the UE is connected (namely, whether or not the UE is in an online or offline state). If there is no response to the transmitted message (e.g., the particular message or paging) from the UE, the RAN informs the core network that the UE is in an offline state. This embodiment is advantageous in that there is small signalling in the section between the RAN and the core network and because the UE merely responds to the network inquiry, an impact of the UE is scarce.

(b) The UE indication method: The core network node transmits a detection time to the RAN through an RANAP (S1-AP/Iu/Gb). The RAN transmits the detection time through an RRC message to the UE. The UE informs the RAN about the online state of the UE at every minimum detection time. When there is no response from the UE within the detection time, the RAN informs the core network that the UE is in an offline state. This method is advantageous in that there is small signalling between the RAN and the core network. Meanwhile, in a different embodiment, the RAN may transmit the detection time to the core network through a NAS message, and the following operation is the same as described above.

In the two methods based on the RRC and the RANAP (S1-AP/Iu/Gb) message, whether or not the UE is currently in an online or offline state may be determined through the response to the message transmitted by the RAN to the UE within the detection time or the message received by the RAN from the UE within the detection time. In the RRC and RANAP (S1-AP/Iu/Gb) message-based methods, information regarding the UE including the detection time must be delivered to every RAN node belonging to the same TA list/RA/LA (Tracking Area list/Routing Area/Location Area) in consideration of location area updating of 3GPP. Meanwhile, the information regarding the terminal may be also delivered by using a message other than the RRC and RANAP message.

(2-3) Hybrid Method (or Complex Method)

A hybrid method for performing an offline indication according to an exemplary embodiment of the present invention is suitable for a case in which, for example, the UE moves from an old tracking area (TA) cell to a new TA cell.

In the occurrence of attach, the core network node (i.e., the SGSN, the MME, or the MSC) requests subscription information of the UE (i.e., the MTC device) from the HLR/HSS, and transmits a detection time to the UE through a NAS message or an RRC message. Also, the core network node transmits the detection time to the attached RAN through a RANAP (S1-AP/Iu/Gb) message.

After the attach procedure, when the UE is changed into the idle mode, namely, when signalling is completed, the UE resets the timer of the detection time. When the timer of the detection time expires, the UE transmits an RRC message informing that it is camped on in the RAN (namely, informing about an offline indication function) to the RAN. Or, an RRC message used for a different purpose may be used instead. Namely, any message may be used, and when at least one or more messages are delivered within the detection time, the online state of the UE is informed by using the delivered message.

When there is information regarding the UE in the RAN node which has received the RRC message, the RAN node delivers a response to the RRC message without a request from the core network, and resets the timer of the detection time. Also, a UE which has received a response resets the timer of the detection time. If there is no information regarding the UE in the RAN node which has received the RRC message, the RAN requests a detection time to the core network by informs the core network that it has requested a function related to the offline indication. The core network checks the UE through authentication, and informs the RAN about a corresponding detection time. The UE informs the RAN that the UE is in an online state through an RRC message at every minimum detection time.

In this manner, the RAN node participating in the attach procedure of the UE operates a timer and is informed by the core network node that the UE is a UE to which an offline indication is to be applied. In this case, the value of the timer is the same as the detection time received from the core network, and whenever the UE transmits a message informing about its presence or status (namely, informing that the UE is in an online state), the RAN node resets the timer. When the timer expires, the RAN node informs the core network about an offline state.

Also, when the UE camps on to a different cell, the timer keeps operating without being reset. When the timer of the UE expires, likewise as described above, the UE transmits an RRC message informing about its presence (i.e., informing about an offline indication function) to the RAN node into which the UE has moved (namely, the RAN which the UE has moved into and camped on), and the RAN node requests information regarding the UE from the core network. If there is no response from the UE until such time as the timer of the detection time expires, the RAN node in which the UE has camped on before its movement informs the core network that the UE is in an offline state. Here, when the UE moves to a different cell, an offline indication of the previous cell and an online indication of the current cell simultaneously arrive, so the core network can recognize that the UE is in an online state in the current cell. When only an offline message arrives, it means that the UE is actually in an offline state. To this end, the core network determines whether or not two messages arrive with a certain tolerance time in consideration of a network delay, or the like. Namely, in actuality, there may be a delay in a message transmission in the network, so the two messages (i.e., the offline indication and the online indication) are likely to arrive with time difference. Thus, the period of the detection time needs to be complemented. In a complementing method, the detection time of the UE may be reduced to be shorter than the original detection time or the detection time of the RAN or the core network may be increased to be longer than the original value. The degree of adjusting the value may be within a few seconds in actuality, and the value results from a network delay. The unit of the detection time is more than a minute unit, so it does not greatly affect the operation. To this end, the core network may transmit the adjusted detection time to the UE or the RAN (detection time of UE<detection time of RAN), the UE may be internally adjust the adjusted detection time such that it is smaller in consideration of a network environment. Or, when the core network determines an offline state, the core network may determine it with a certain tolerance.

(3) Method of Informing about Event

Here, an event refers to a case in which the offline state of the UE is detected. When the offline state of the UE is detected, a function of informing the MTC server or the user about the offline state of the UE is required. When the event is informed, included information is, for example, as follows.

IMSI: UICC ID of the MTC device;

Event type: Type of occurring event (e.g., monitoring ? allowed location error, offline of MTC device;

Generation time: duration of event occurrence (e.g., unit of second)

Location: location at which event occurs (e.g., cell id, or the like);

Device ID (IMEI): id of device in use (e.g., delivered IMEI)

The sequential process of registering subscriber information to the MTC server, detecting an offline (or online) state of the UE at every detection time by operating the timer of the detection time, and reporting an offline indication of the UE as occurred will now be described with reference to FIGS. 3 to 7.

Figure 3:
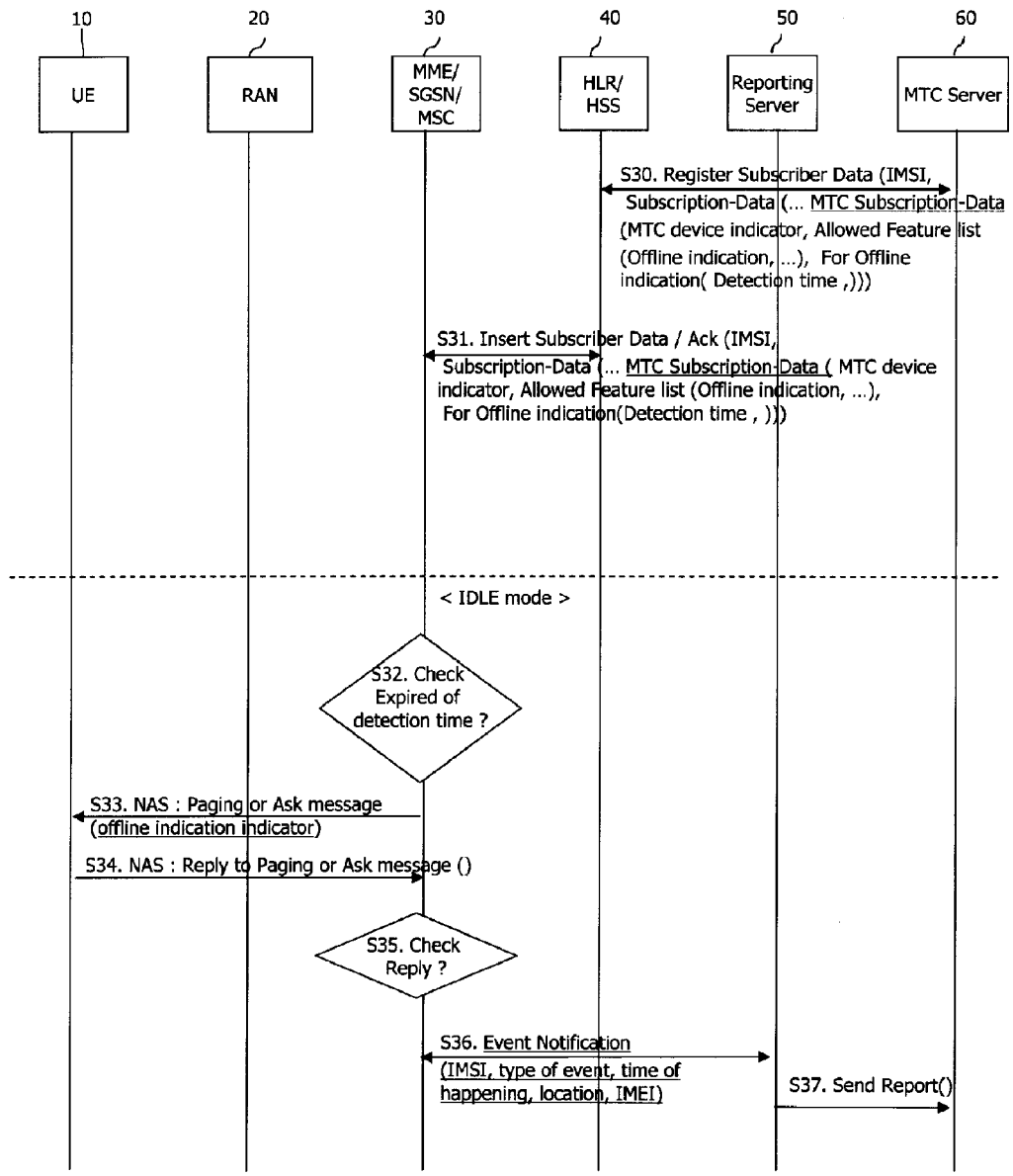
FIG. 3 is a signal flow chart illustrating the process of a method for performing offline indication of an MTC device as a network polling method among NAS message-based methods according to an exemplary embodiment of the present invention.

In FIGS. 3 to 7, the core network node handling an offline indication of the MTC device is the MSC, the SGSN, or the MME, and the offline indication process in the embodiment of FIG. 3 is performed in an attach procedure, but it may be also similarly applied for the case of TAU/RAU/LAU/Handover. Also, in FIGS. 3 to 7, the core network node handling the offline indication is the MSC, the SGSN, or the MME, and the offline indication process in the present exemplary embodiment is performed when the UE is in the idle mode.

In FIGS. 3 to 7, the MTC user registers subscription information (i.e., Register Subscriber Data) to an MTC server 60. In this case, the information registered to the MTC server is as shown in Table 1 as described above. Namely, the subscription information is configured on the basis of the subscriber information of 3GPP for the sake of convenience. The subscriber information of 3GPP is configured as subscription data using IMSI as a main index. The subscription data element includes several sub-elements. For the MTC device, 'MTC-Subscription-Data' is newly defined in which 'MTC device indicator' and 'Allowed Feature list (Offline indication, . . . )' are configured, and a detection time is delivered for an offline indication. Here, in a different embodiment, the 'MTC device indicator' may be used together with an IMSI to indicate the MTC device.

Meanwhile, the MTS server 60 exists outside the 3GPP core network, so the storage format may be non-standard, but it transmits data in a standard format to the HLR/HSS 40, the 3GPP core network node.

FIG. 3 is a signal flow chart illustrating the process of a method for performing offline indication of an MTC device as a network polling method among NAS message-based methods according to an exemplary embodiment of the present invention.

In the embodiment illustrated in FIG. 3, the core network transmits a NAS message inquiring about an online or offline state to the UE at every minimum detection time, and the UE responds thereto. This will now be described with reference to FIG. 3.

The MTC user registers subscription information (Register Subscriber Data) to the MTC server 60. The MTC server 60 delivers subscription information to an HLR/HSS 40 (step S30). In this case, the information registered to the MTC server 60 is as shown in Table 1 and Table 2 as described above.

The HLR/HSS 40 transmits the subscription information, which has been received from the MTC server 60, to the core network node, i.e., to an MME/SGSN/MSC 30 that performs an offline indication in FIG. 3, by using an 'Insert Subscriber Data' message (step S31). Here, the MME/SGSN/MSC 30 is a network entity performing an offline indication. In the following description, the respective entities of an MME, an SGSN, and an MSC are considered as a single entity, for the sake of convenience. In step S31, as described above with reference to Table 1 and Table 2, the core network node (i.e., one of the MME, SGSN, and MSC) 30 performing monitoring receives subscriber information (or subscriber data) such as "MTC device indicator' indicating whether or not a monitoring target is an MTC device and features for performing the offline indication of the MTC device (e.g., 'Allowed Feature list (offline indication)' and a detection time for offline indication). Referring to step S31, the subscription information is configured on the basis of subscriber information of 3GPP for the sake of convenience. Namely, the subscriber information of 3GPP is configured as subscription data using an IMSI as a main index. An element (or parameter) (Subscription-Data element) of the subscription data includes several sub-elements. For the MTC device, 'MTC-Subscription-Data' is newly defined in which 'MTC device indicator' and 'Allowed Feature list (Offline indication, . . . )' are configured, and a detection time is delivered for an offline indication. Here, in a different embodiment, the 'MTC device indicator' may be used together with an IMSI to indicate the MTC device.

The UE 10 is currently in an idle mode.

The core network node (MME/SGSN/MSC) 30 checks whether the timer with respect to the corresponding MTC device 10 has expired (step S32).

When the timer for detecting a detection time has expired, the core network node (MME/SGSN/MSC) 30 delivers NAS-level paging or a particular message (e.g., an ACK message) to the UE 10 to check whether or not the UE 10 is in an online state (step S33). In this case, an existing message may be used or a new message may be defined and used for the function (or command) of step S33. Also, the message in step 33 (the paging message or the ACK message in FIG. 3) may include an 'Offline indication' indicator (or a parameter or an element) so as to be delivered. The UE 10 responds thereto and may not perform any other operation. For example, the UE 10 may respond to the paging, but not to the 'offline indication' indicator, according to an intention of the paging message. The UE 10 may check the 'offline indication' indicator included in the message and determine that the network (core network) performs an offline indication.

The UE 10 makes an appropriate response to the corresponding paging or the particular message (the paging message or the ACK message in FIG. 3) (step S34).

The core network node (MME/SGSN/MSC) 30 checks whether or not the UE has responded to the paging or Ack message of step S33 through a NAS message (step S35). By checking a response message transmitted by the UE 10, the core network 30 is able to determine (check) whether or not the UE is in an online state.

Meanwhile, when there is no response message from the UE 10 of the step S34, it means that the UE is in an offline state (namely, an offline indication). As described above, the core network node (MME/SGSN/MSC) 30 delivers a report (notification) including the IMSI, the offline indication, time of happening (occurrence time), a location, a device ID (IMEI), and the like, to the reporting server 50 (step S36). This may be delivered as a message having a similar form as the NAS, a message in the form of an SMS, or the like.

The reporting server 50 delivers an event occurrence message (namely, offline indication indicating that the UE is in an offline state) to the MTC server 60 (step S37). Meanwhile, the MTC server 60 may exist outside the 3GPP core network.

Figure 4:
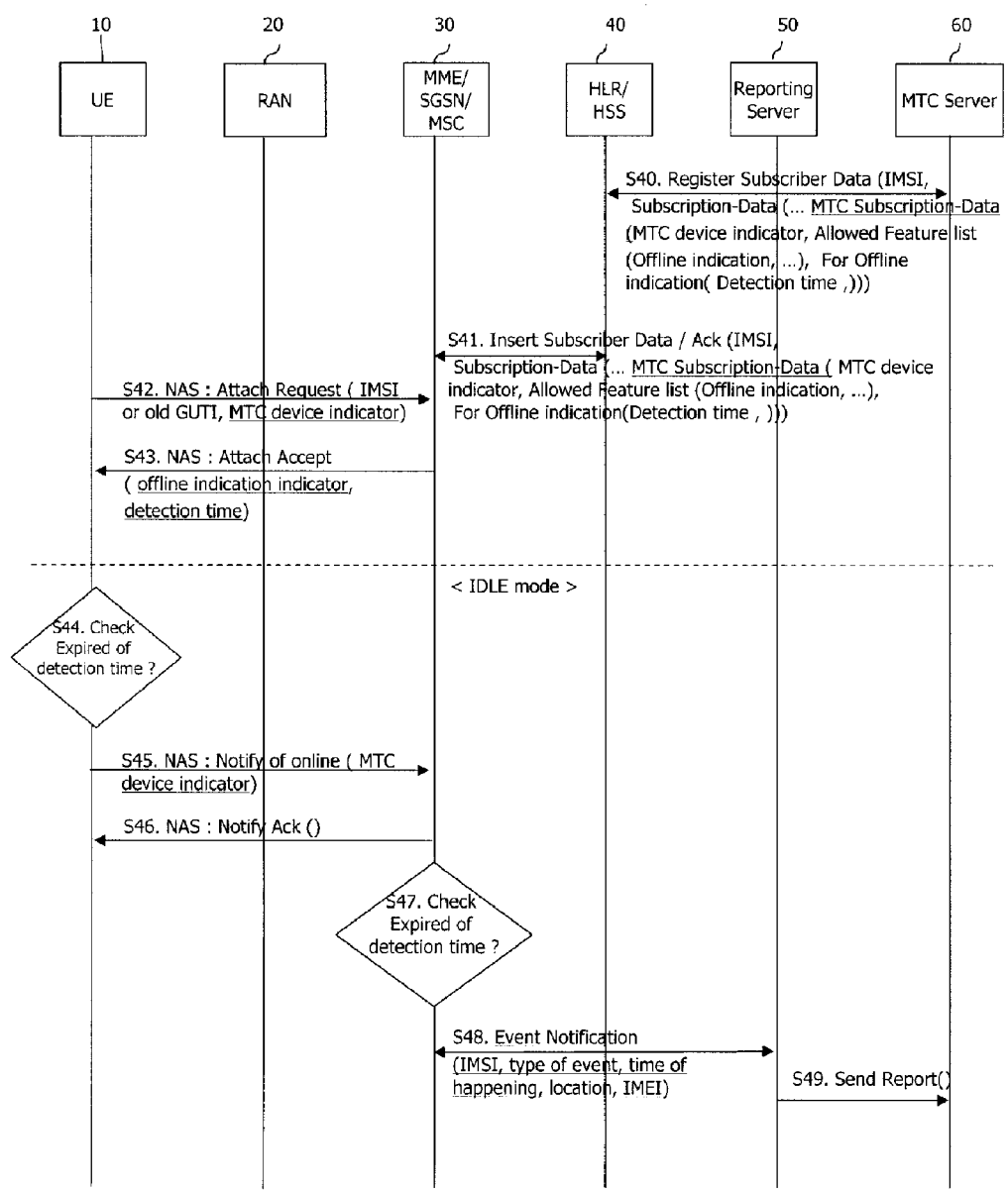
FIG. 4 is a signal flow chart illustrating the process of a method for performing offline indication by a UE among the NAS message-based methods according to an exemplary embodiment of the present invention.

FIG. 4 is a signal flow chart illustrating the process of a method for performing offline indication by a UE among the NAS message-based methods according to an exemplary embodiment of the present invention.

Steps S40 and S41 are the same as steps S30 and S31 of FIG. 3. Thus, the description of the steps S30 and S31 of FIG. 3 will be used for the steps S40 and S41.

The core network node (MME/SGSN/MSC) 30 receives an attach request message using a NAS message from the UE 10 (step S42). The message in step S42 includes an ID (IMSI) of the UE subscriber and 'MTC device indicator'. Namely, the UE 10 transmits the IMSI, the ID of the UE, through Attach to the core network, and informs the core network that the UE 10 is an MTC device by using an 'MTC device indicator'.

The core network node (MME/SGSN/MSC) 30 checks the 'MTC device indicator' of the attach request message received from the UE 10 to determine that the UE is an MTC device. In order to perform an offline indication on the UE 10, the core network node (MME/SGSN/MSC) 30 transmits an indicator of 'offline indication' and its detection time through an attach accept message (step S43). The 'offline indication indicator' and the detection time are transmitted so that the UE 10 can periodically report (notify or indicate) the core network about the offline state of the UE 10. Meanwhile, in step S43, the online state of the UE may be maintained by utilizing the existing NAS message or a new message may be defined. In this case, the existing NAS message may be, for example, TAU (Tracking Area Update)/RAU (Routing Area Update) message, or the like.

Thereafter, when the UE 10 is in an idle mode, the UE 10 checks the 'offline indication indicator' and the detection time received in step S43, and operates the timer of the detection time. And then, whenever the NAS message is delivered, the UE 10 resets the timer of the detection time. The UE 10 checks whether or not the timer expires (step S44). When the timer expires, the UE 10 notifies the core network node 30 about whether or not the UE is in an offline state or in an online state by using a NAS message. Namely, the UE 10 delivers the NAS message to the core network node 30 at every detection time (step S45). Namely, at the UE's stance, the UE 10 checks the 'offline indication indicator' and determines repeatedly performing of the offline indication at every pre-set, received detection time (namely, the detection time). The NAS message in step S45 is a message for notifying whether or not the UE 10 is an online state and includes the 'MTC device indicator'.

The core network node (MME/SGSN/MSC) 30 delivers a response to the NAS message for the offline indication in step S45 through a NAS message (Notify Ack in FIG. 4) (step S46).

Meanwhile, the core network node (MME/SGSN/MSC) 30 operates the detection time timer and checks whether or not a NAS message arrives at every detection time (step S47). And then, when an event occurs, namely, when an offline indication occurs, the core network node (MME/SGSN/MSC) 30 informs the reporting server 50 accordingly (step S48). Step S45 is the same as step S36 in FIG. 3, so the description of step S36 in FIG. 3 will be used for step S48.

Figure 5:
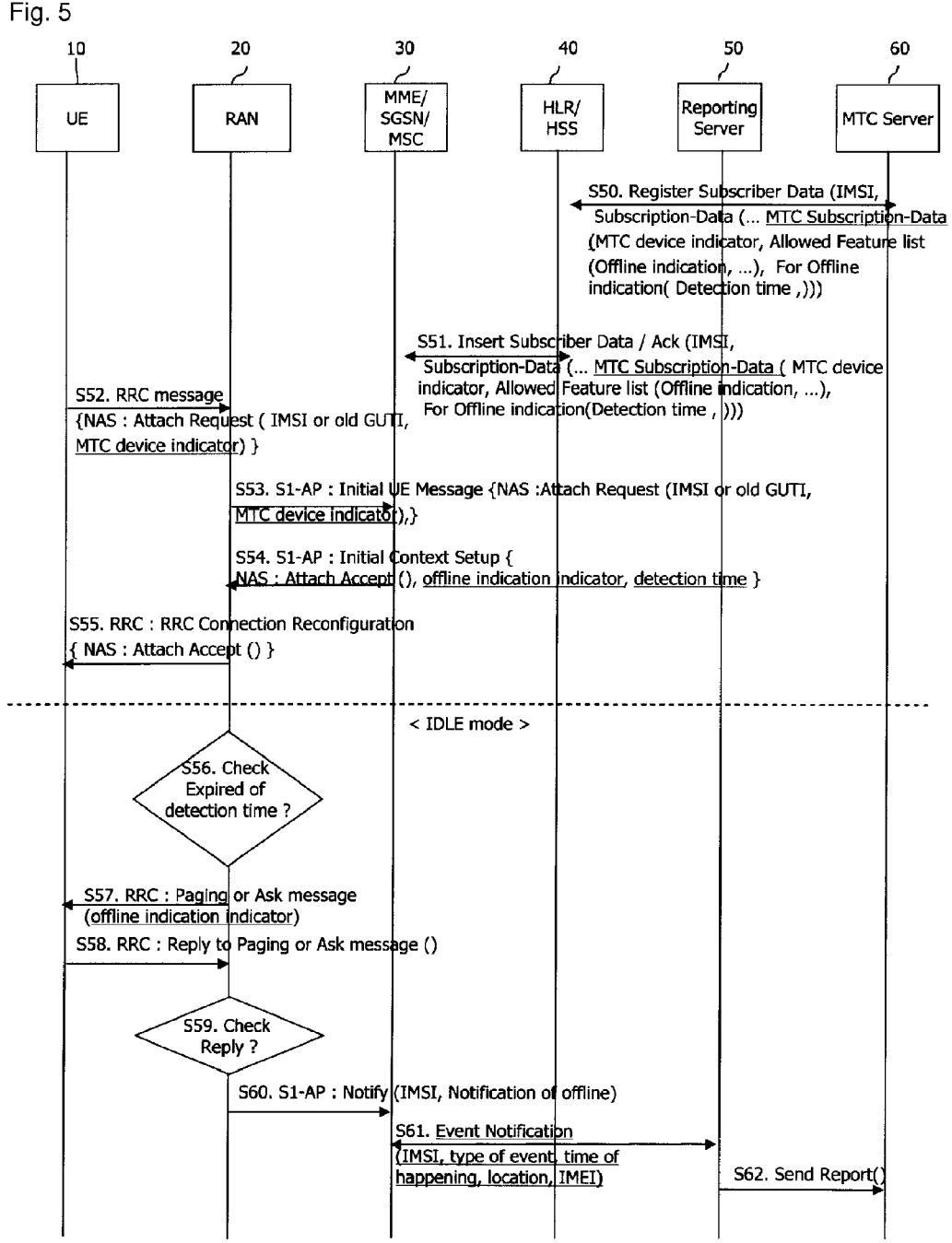
FIG. 5 is a signal flow chart illustrating the process of a method for performing offline indication of an MTC device as a network polling method among RRC and RANAP (S1-AP/Iu/Gb) message-based methods according to an exemplary embodiment of the present invention.

FIG. 5 is a signal flow chart illustrating the process of a method for performing offline indication of an MTC device as a network polling method among RRC and RANAP (S1-AP/Iu/Gb) message-based methods according to an exemplary embodiment of the present invention.

The embodiment of FIG. 5 can be described briefly as follows: The core network node (MME/SGSN/MSC) 30 transmits a detection time to the RAN 20 through an S1-AP message. The RAN 20 operates the timer of the detection time and transmits a particular message or paging to the UE 10 at every minimum detection time to check a connection of the UE (i.e., an online or offline state). When there is no response to the particular message or paging from the UE 10, the RAN 20 informs the core network that the UE is in an offline state. The embodiment of FIG. 5 is advantageous in that a signaling load between the RAN 20 and the core network is small.

This will be described with reference to FIG. 5.

Steps S50 and S51 are the same as steps S30 and S31 in FIG. 3. Thus, the description of steps S30 and S31 of FIG. 3 will be used for steps S40 and S41.

The UE 10 informs the core network node 30 of its ID (i.e., IMSI) and that the UE is an MTC device (namely, the UE 10 transmits 'MTC device indicator' to the core network node 30) (steps S52 and S53). Accordingly, the core network node 30 recognizes that an attach request from a UE has been delivered from the UE 10 through the 'MTC device indica-tor'. Meanwhile, in a different embodiment, a particular value may be used instead of the ID (IMSI) of the UE, or a method of allocating a particular range, or the like may be used. Meanwhile, an attach request message may be included in a NAS message and transmitted to the core network node (MME/SGSN/MSC) 30 in steps S52 and S53. In this case, as the attach request message of the NAS message, an RRC message is used between the terminal 10 and the RAN 20 (step S52), and an S1-AP message is used between the RAN 20 and the core network node (MME/SGSN/MSC) 30 (step S53).

The core network node (MME/SGSN/MSC) 30 checks the ID and/or 'MTC device indicator' included in the attach message, upon which the core network node (MME/SGSN/MSC) 30 can recognize that the UE 10 is an MTC device. Accordingly, the core network node (MME/SGSN/MSC) 30 transmits the 'offline indication indicator' and the detection time to the RAN 20 through an S1-AP message so that the RAN 20 can periodically perform indication (namely, notifies the core network of an online or offline state of the UE 10) with respect to the UE 10 for an offline indication (step S54). In step S54, the transmission is made by using Attach Accept message of a NAS message. The RAN 20 checks the 'offline indication indicator' and the detection time included in the message of step S54, and when the UE 10 is in an idle mode, the RAN 20 checks an offline indication from the UE 10 by using a detection time timer. And, the RAN 20 delivers the Attach Accept message with respect to the step S52 to the UE 10 through an RRC message in step S55.

Thereafter, when the UE 10 enters an idle mode state, an offline indication is performed.

Namely, the RAN 20 operates the timer by using the information, namely, the detection time, received from the core network node 30 and periodically transmits a paging message or a particular message (e.g., an ACK message) to the UE 10 through an RRC message at every detection time.

Namely, the RAN 20 checks whether or not the timer of the detection time with respect to the UE 10 has expired (step S56). When the timer of the detection time expires, the RAN 20 delivers an RRC-level paging or message (e.g., ACK message) to check whether or not the UE 10 is in an online state (step S57). In this case, an existing message may be used or a new message may be defined and used, for the message (or command) of step S57. Also, the message of step S57 may deliver also 'offline indication indicator' to inform the UE 10 that the purpose of paging in step S57 is the offline indication.

The UE 10 responds to the paging or message of step S57 (step S58). In this case, the UE 10 may respond to the message of step S57, without performing any other operation.

The RAN 20 checks whether or not there is a response (or reply) to the RRC message of step S57 in step S59. When there is no response from the UE 10, the RAN 20 informs the core network node 30 that the UE 10 is in an offline state in step S60.

The respective operations of steps S61 and S62 are the same as those of steps S36 and S37, so the description of the steps S36 and S37 of FIG. 3 are used as it is for the steps S61 and S62.

Figure 6:
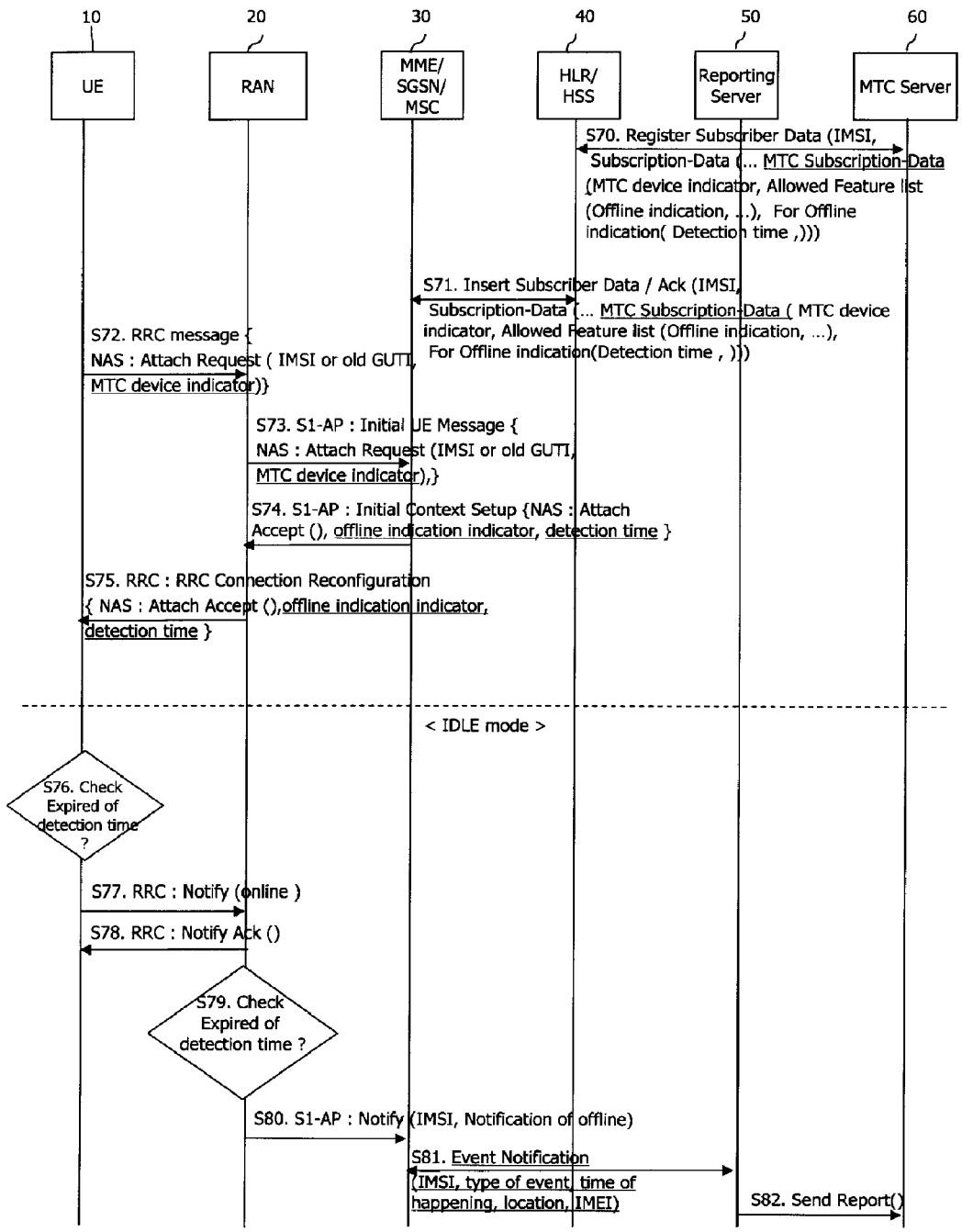
FIG. 6 is a signal flow chart illustrating the process of a method for performing offline indication by a UE among RRC and RANAP (S1-AP/Iu/Gb) message-based methods according to an exemplary embodiment of the present invention.

FIG. 6 is a signal flow chart illustrating the process of a method for performing offline indication by a UE as a network polling method among RRC and RANAP (S1-AP/Iu/Gb) message-based methods according to an exemplary embodiment of the present invention.

Namely, in an embodiment of FIG. 6, the UE 10 receives a detection time from the core network, and informs the RAN 20 of its online state through an RRC message at every minimum detection time. When the RAN 20 does not receive a response from the UE 10, the RAN 20 informs the core network that the UE 10 is in an offline state through an S1-AP message. The embodiment of FIG. 6 is advantageous in that a signaling load of the RAN and the core network is small.

This will now be described with reference to FIG. 6.

Steps S70 to S74 are the same as steps S50 and S54 of FIG. 5. Thus, the description of steps S50 to S54 will be used for steps S70 to S74 of the embodiment of FIG. 6.

The RAN 20 transmits an Attach Accept message by using a NAS message at the level of RRC in response to step S72 (step S75). In this case, the RAN 20 delivers information, namely, detection time, received from the core network node 30 to the UE 10 by using an RRC message. Also, the RAN 20 transmits 'offline indication indicator' to the UE 10. The UE 10 drives the timer by using the received detection time, and delivers a notification message to the RAN 20 at every detection time of the driven timer.

Thereafter, when the UE 10 enters an idle mode, the timer of the UE 10 operates, and then the UE 10 checks whether or not the timer of the detection timer expires (step S76). Whenever the timer of each detection time expires, the UE 10 delivers an RRC-level notification message informing about an online state of the UE 10 to the RAN 20 (step S77). When the RAN receives the notification message from the UE 10, the RAN 10 delivers an ACK message as a response, to the UE 10 (step S78).

Meanwhile, when the UE 10 is in an offline state, the UE 10 cannot transmit a notification message informing of an online state of step S77. Thus, the RAN 20 needs to have an additional timer to count reception of a notification message informing about an online state from the UE 10. Namely, the RAN 20 drives its own timer set at the detection time and checks whether the timer of the detection time expires (step S79).

When the RRC-level notification message is not received from the UE 10 until before the timer provided in the RAN 20 expires, the RAN 20 determines that the UE 120 is currently in an offline state and informs the core network node 30 accordingly through an S1-AP message.

The operations of steps S81 and S82 in FIG. 6 are the same as those of steps S36 and S37 of FIG. 3, so the description of the steps S36 and S37 of FIG. 3 will be used for the steps S81 and S82, The method for performing a hybrid offline indication will now be described with reference to FIG. 7.

Figure 7:
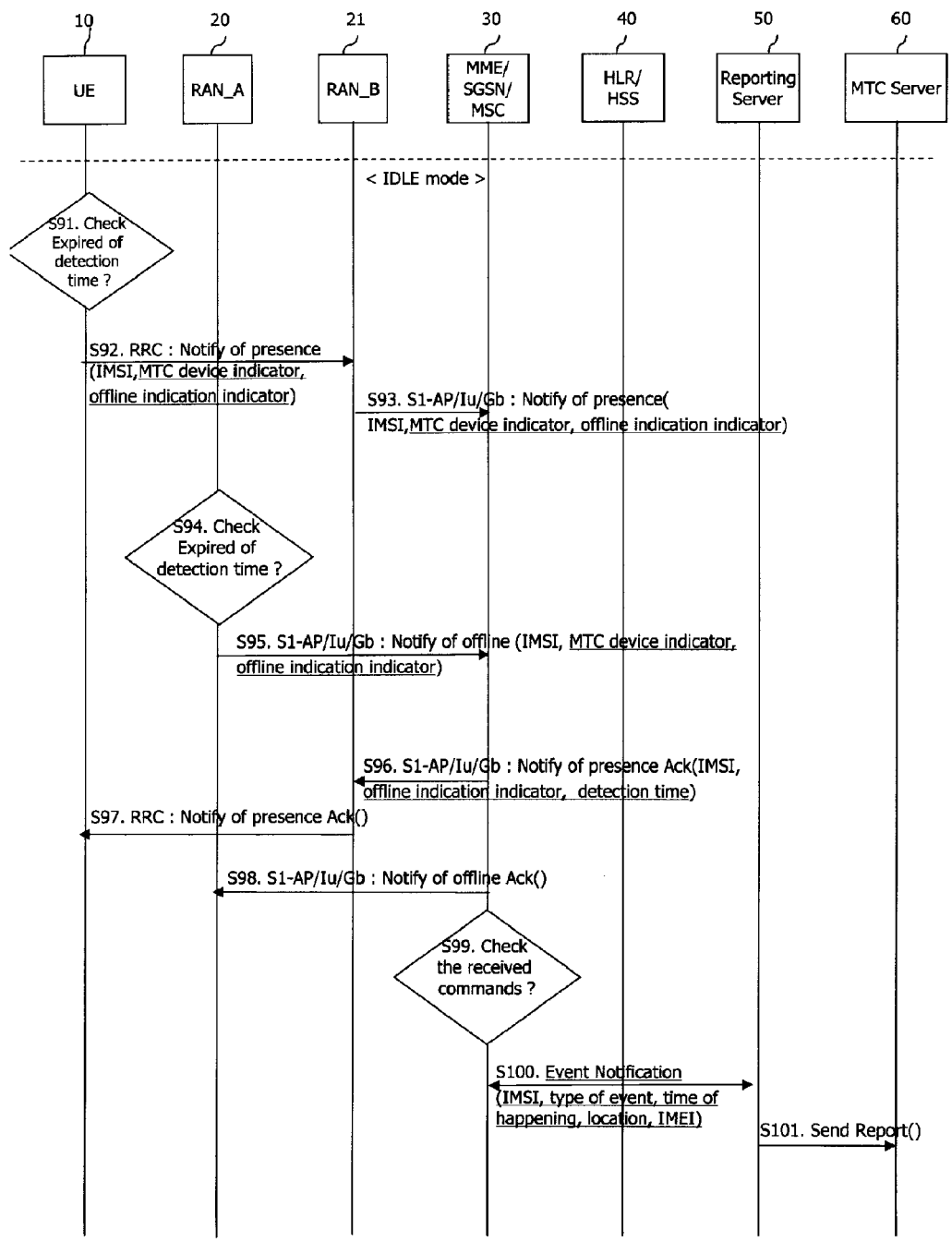
FIG. 7 is a signal flow chart illustrating the process of a method for performing offline indication in consideration of the case in which the UE moves according to an exemplary embodiment of the present invention.

FIG. 7 is a signal flow chart illustrating the process of a method for performing offline indication in consideration of the case in which the UE moves according to an exemplary embodiment of the present invention. Namely, FIG. 7 shows a method for performing hybrid offline indication in which the UE, which is camping on in a particular cell, moves to a different cell.

When the UE 10 does not perform Attach operation, or when the UE 10 does not move from a current cell to a different cell, the embodiment of FIG. 7 is the same as the operation of the embodiment of FIG. 6. The embodiment of FIG. 6 is that the UE 10 delivers information regarding a cell served by the RAN 20 (i.e., RAN 20 cell) in which the UE 10 is currently camping on, to the core network node. Meanwhile, in the embodiment of FIG. 7, it is assumed that the UE 10 moves from the RAN_A 20 cell to a RAN_B 21 cell, and the procedure will now be described.

In the embodiment of FIG. 7, it is assumed that the sequential operations of steps S70 to S75 in the embodiment of FIG. 6 have been already performed before the UE 10 enters an idle mode. Namely, like the steps S70 to S75 in the embodiment of FIG. 5, the RAN_A 20 receives an Attach request message from the UE 10 and delivers it to the core network node 30, and the RAN_A 20 receives information for performing an offline indication such as 'offline indication indicator' and a 'detection time' from the core network node 30 and delivers the received information to the UE 10. Thus, because the UE 10 has been camped on the RAN_A 20 cell, the RAN_A 20 has the information regarding the UE 10. If the UE 10 moves from the RAN_A 20 to the RAN_B 21, because there is no message exchange between the core network node 30 and the UE 10, the RAN_B 21 does not have information regarding the UE 10.

After the UE 10 moves to the RAN_B 21, it enters an idle mode.

The UE 10 drives a timer by using information related to the offline indication received from the RAN_A 20, e.g., information regarding the detection time, and then checks whether or not the timer expires (step S91). When the timer of every detection time has expired, the UE 10 delivers a notification message informing of an RRC-level online state to the RAN (RAN_B) 21 (step S92). In this case, the 'MTC device indicator' is included in the notification message to inform that the UE 10 is an MTC device, and 'offline indication indicator' is included in the notification message and transmitted to inform the core network that the offline indication function can be performed.

When there is no context information regarding the UE 10 in the RAN_B 21, the RAN_B 21 transmits a notification message informing that a request for an offline indication has been received from the UE 10, to the core network node 30 (step S93). Meanwhile, the RAN (RAN_A) 30 operates the timer and checks whether or not the detection time of the timer has expired (step S94). When there is no notification such as a notification message or the like with respect to the offline indication from the UE 10 until when the timer expires, the RAN (RAN_A) 30 informs that the UE 10 is in an offline state through an S1-AP message (step S95). In this case, the S1-AP includes 'MTC device indicator' and 'offline indication indicator'.

The core network node 30 receives the notification message of step S93 and that of step S95 through an S1-AP message performs corresponding signaling S96 to S98. Namely, at the core network's stance, the core network node 30 checks the online state of the UE 10 through the message of steps S93 and S95.

With respect to the notification of step S93, the core network node 30 determines that the UE 10 is an MTC device, and transmits 'offline indication indicator' and 'detection time' for driving the timer to the RAN_B 21 so that a periodic indication for an offline indication can be performed in the RAN_B 21 (namely, the RAN in which the UE 10 is camping on) (step S96). Then, the RAN_B 21 resets the timer with respect to the detection time. The RAN_B 21 transmits a response message with respect to the RRC request message of step S92 to the UE 10 (step S97). Upon receiving the response message, the UE 10 resets the timer of the detection time.

Meanwhile, the core network node 30 transmits a response message with respect to the notification (or request) from the RAN_A 20 of step S95 (step S98). Thereafter, the RAN_A 20 deletes the information related to the UE 10.

The core network node 30 checks whether two messages corresponding to steps S93 and S95 have arrived (step S99). In step S99, the core network node 30 may compare the information (e.g., IMSI, MTC device indicator, offline indication indicator) included in the received message of step S93 and information (e.g., IMSI, MTC device indicator, offline indication indicator) included in the received message of step S95 and determine whether or not the UE 10 is a terminal which has moved from the RAN_A 20 to the RAN_B 21 and the terminal (MTC device) which is target of the two messages corresponding to the steps S93 and S95. The offline state of the UE 10 can be determined on the basis of the two messages of steps S93 and S95 according to the determination of the core network node 30. In a different embodiment, when only the message informing of the offline state of step S95 has arrived, the core network node 30 may determine that the UE 10 is currently in an offline state.

In this manner, when the UE 10 is determined to be in an offline state, steps S100 and S101 are performed. In this case, the operations of steps S100 and S101 are the same as those of the steps S36 and S37 of FIG. 3, so the description of the steps S36 and S37 of FIG. 3 will be used for steps S100 and S101.

The method described so far may be implemented by software, hardware or their combination. For example, the method according to the present invention may be stored in a storage medium (e.g., an internal memory, a flash memory of a mobile terminal, a hard disk, or the like), and may be implemented by codes or command languages in a software program that can be executed by a processor (e.g., an internal microprocessor of a mobile terminal).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for performing an offline indication of a machine type communication (MTC) device in a mobile communication system, the method comprising:
   receiving, by a core network node, a first notification message informing that a user equipment (UE) can perform an offline indication from a first radio access network (RAN);
   receiving, by the core network node, a second notification message regarding an offline indication of the UE from a second RAN;
   comparing, by the core network node, the first notification message received from the first RAN and the second notification message received from the second RAN to determine whether or not the UE is in an offline state;
   receiving, by the core network node, MTC information including a detection time from an HSS (Home Subscription Server); and
   transmitting, by the core network node, the MTC information including the detection time to the UE through the second RAN.

2. The method of claim 1, further comprising:
   when it is determined that the UE is in an offline state in the comparing operation, reporting, by the core network node, to a reporting server that the UE is in an offline state.

3. The method of claim 1, wherein the first notification message comprises at least one or more of an ID of the UE, an MTC device indicator indicating that the UE is an MTC device, and an offline indication indicator indicating that the UE can perform an MTC offline indication.

4. The method of claim 1, wherein the second notification message comprises an ID of the UE, an MTC device indicator indicating that the UE is an MTC device, and an offline indication indicator indicating that the UE can perform an MTC offline indication.

5. The method of claim 1, wherein the comparing operation comprises:
   comparing information regarding an offline indication included in the second notification message received from the second RAN and information regarding an offline indication included in the first notification message received from the first RAN;
   determining whether or not the notification messages have been transmitted from the same UE according to the comparison results; and
   when it is determined that the notification messages have been transmitted from the same UE, determining that the UE is in an offline state on the basis of the notification message received from the first RAN.

6. The method of claim 1, wherein the second notification message is transmitted from the second RAN after a timer using the detection time included in the MTC information expires.

7. The method of claim 6, further comprising:
   after the second RAN transmits the second notification message, resetting the timer.

8. The method of claim 1, further comprising:
   transmitting, by the core network node, a response message with respect to the first notification message to the UE through the first RAN; and
   transmitting, by the core network node, a response message with respect to the second notification message to the second RAN.

9. The method of claim 8, wherein the response message transmitted to the first RAN comprises at least one or more of an ID of the UE, an MTC device indicator indicating that the UE is an MTC device, and an offline indication indicator indicating that the UE can perform an MTC offline indication, so that the first RAN can perform an offline indication with respect to the UE.

10. The method of claim 1, wherein the first RAN is a cell to which the UE has moved and is currently camping on, and the second RAN is a cell in which the UE was connected before it was moved therefrom.

* * * * *